(12) United States Patent
Schumacher et al.

(10) Patent No.: US 8,526,014 B2
(45) Date of Patent: Sep. 3, 2013

(54) POSITIONING DEVICE AND METHOD FOR DETECTING A LASER BEAM

(75) Inventors: Lars Schumacher, Relsberg (DE); Robert G. Conner, New Carlisle, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 235 days.

(21) Appl. No.: 12/999,697

(22) PCT Filed: Jun. 19, 2008

(86) PCT No.: PCT/US2008/067464
§ 371 (c)(1),
(2), (4) Date: Dec. 17, 2010

(87) PCT Pub. No.: WO2009/154625
PCT Pub. Date: Dec. 23, 2009

(65) Prior Publication Data
US 2011/0141488 A1    Jun. 16, 2011

(51) Int. Cl.
*G01B 11/24*    (2006.01)
(52) U.S. Cl.
USPC .......................................................... 356/614
(58) Field of Classification Search
USPC .......................................................... 356/614
See application file for complete search history.

(56) References Cited

U.S. PATENT DOCUMENTS

| | | | |
|---|---|---|---|
| 3,614,025 A | 10/1971 | Maillet et al. | |
| 4,286,760 A | 9/1981 | Couderc et al. | |
| 4,565,339 A | 1/1986 | Lonnoy et al. | |
| 4,963,022 A | 10/1990 | Sommargren | |
| 6,037,874 A | 3/2000 | Heironimus | |
| 6,473,167 B1 * | 10/2002 | Odell | 356/141.4 |
| 6,646,732 B2 | 11/2003 | Ohtomo et al. | |
| 7,022,962 B2 * | 4/2006 | Ohtomo et al. | 250/206.1 |
| 7,110,102 B2 | 9/2006 | Ohtomo et al. | |
| 7,148,958 B2 * | 12/2006 | Ohtomo et al. | 356/141.3 |
| 2003/0136901 A1 | 7/2003 | Ohtomo et al. | |
| 2007/0024845 A1 | 2/2007 | Essling et al. | |

FOREIGN PATENT DOCUMENTS

| | | |
|---|---|---|
| DE | 1623354 A1 | 3/1971 |
| DE | 4110766 A1 | 10/1992 |
| DE | 60109113 T2 | 2/2006 |

(Continued)

OTHER PUBLICATIONS

International Preliminary Report on Patentability and Written Opinion dated Dec. 21, 2010 pertaining to International Application No. PCT/US2008/067464.

(Continued)

*Primary Examiner* — Tu Nguyen
(74) *Attorney, Agent, or Firm* — Dinsmore & Shohl LLP

(57) ABSTRACT

The present disclosure relates to a positioning system including a positioning device and method for detecting light of fan shaped laser beam. The positioning device includes a detector for detecting light of the fan shaped laser beam rotating around a propagation axis with a direction of rotation and having two detector elements arranged in a known spatial relation for outputting a detection signal when irradiated. A position determining unit is used to obtain a first set of detection signals from the detector elements, to determine a first time relation between the detection signals of the first set, and to determine a positional relation between the detector and the propagation axis based on the first time relation.

17 Claims, 11 Drawing Sheets

(56) References Cited

FOREIGN PATENT DOCUMENTS

| | | |
|---|---|---|
| DE | 102005000048 A1 | 11/2006 |
| DE | 102005000140 A1 | 4/2007 |
| DE | 112005001760 T5 | 6/2007 |
| EP | 0264591 A2 | 4/1988 |
| EP | 0 653 601 A1 | 5/1995 |
| EP | 1166042 B1 | 1/2002 |
| EP | 1211484 A2 | 6/2002 |
| EP | 1632747 A2 | 3/2006 |
| EP | 1691167 A2 | 8/2006 |
| EP | 1876415 A1 | 1/2008 |
| GB | 2090096 A | 6/1982 |
| GB | 2173369 A | 10/1986 |
| GB | 2213673 A | 8/1989 |
| JP | 2002030886 A | 1/2002 |
| JP | 2007010376 A | 1/2007 |
| WO | 0165206 A2 | 9/2001 |
| WO | 0165207 A2 | 9/2001 |
| WO | 2004113835 A1 | 12/2004 |
| WO | 2006022879 | 3/2006 |

OTHER PUBLICATIONS

International Search Report dated Feb. 4, 2009 pertaining to International Application No. PCT/US2008/067464.

* cited by examiner

POSITIONING DEVICE AND METHOD FOR DETECTING A LASER BEAM

BACKGROUND

The present invention relates to a positioning device and a positioning method for detecting light of fan shaped laser beam, as well as to a positioning system comprising the positioning device and to a light emitting device emitting the fan shaped laser beam.

Various kinds of surveying instruments are used for measuring distances and angles between objects. Hereby, several conventional surveying instruments use a laser source to measure the distance to or the position of an object by performing an electro-optical measurement.

When measuring the distance or position, the operator has to verify that the laser beam of the laser source actually impinges on the object at a desired position. However, a laser spot, e.g. impinging on a wall, is usually quite small, and in Z-mode at a far distance a user may have difficulty finding the laser spot with the naked eye or with a conventional photo-detector. Additionally, the intensity of the laser beam decreases over the distance so that the intensity of backscatter light from the wall further decreases.

Therefore, due to the small size of the laser spot and the distance from the laser source, it may be cumbersome and sometimes even impossible to find the laser spot with the eye or by moving around a photodetector in a target area.

Furthermore, finding a small laser spot gets even more complicated under field conditions, such as snow, rain and wind, in which a quick and secure detection is desired.

Therefore, the need arises for a positioning device and positioning method enabling to find a spot of a laser beam easier and quicker.

SUMMARY

According to an embodiment, a positioning device comprises a detector for detecting light of a fan shaped laser beam rotating around a propagation axis with a direction of rotation and having at least two detector elements arranged in a known spatial relation to one another for outputting a detection signal when irradiated by the fan shaped laser beam, and a position determining unit to obtain a first set of detection signals from the detector elements, to determine at least one first time relation between the detection signals of the first set, and to determine a positional relation between the detector and the propagation axis based on the first time relation. Accordingly, a positional relation between the detector and the propagation axis may be obtained so that the detector may be moved towards the propagation axis, i.e. towards the center axis of rotation of the light cone produced by the rotating fan shaped laser beam. Alternatively, the propagation axis or direction of the laser emission may be moved to the detector, if the position of the detector is desired. Using such a detector allows that the laser beam, i.e. its center in the case of the fan shaped laser beam, may be automatically guided by the detector output. Further, apart from visible laser light, it is also possible to use infrared or near-infrared laser light, for which several small and low cost laser sources exist. For example, according to the positional relationship, it may be determined whether the detector is positioned to the left or right of the center of the fan shaped laser beam, i.e. the propagation axis, or above or below of the center of the fan shaped laser beam.

According to an advantageous example, the first set of detection signals is obtained from detector elements arranged along a first line and the position determining unit is adapted to obtain a second set of detection signals from detector elements arranged along a second line. Further, the first and second lines are not parallel with respect to each another and the position determining unit determines at least one second time relation between the detection signals of the second set. Accordingly, in addition to the first time relation based on detector elements arranged along a first line, a second time relation based on detector elements arranged along a second line may be obtained so that with each set an area may be defined, in which the detector is placed with respect to the propagation axis, whereby the positional relationship between the detector and the propagation axis can be more concretely specified by the two areas. Preferably, the first line and the second line are perpendicular with respect to each other to define a quadrant in a plane, in which the detector is located.

According to another advantageous example, the first time relation is a first time sequence of the detection signals of the first set and the position determining unit is adapted to determine one of at least two segments of a plane intersecting the propagation axis, in which the detector is located. Accordingly, segments of a plane intersecting the propagation axis may be defined. For example, it may be determined whether the detector is placed in a right or left semicircle segment of the base of the light cone produced by the rotating fan shaped laser beam using the known direction of rotation and the knowledge of which detector element detects light first.

According to another advantageous example, the second time relation is a second time sequence of the detection signals of the second set and the position determining unit is adapted to determine one of at least four segments of the plane intersecting the propagation axis, in which the detector is located, based on the first time sequence and the second time sequence. Accordingly, in addition to the first time sequence, determining for example a left or right semicircle segment, the second time sequence may determine an upper or lower semicircle segment of the plane. Therefore, by determining an overlap of the two semicircle segments obtained from the first time sequence and the second time sequence, it is possible to determine one of four segments, e.g. a quarter circle segment, of the base of the light cone produced by the rotating fan shaped laser beam.

According to another advantageous example, the detector includes at least three detector elements, a first connecting line between a first one of the detector elements and a second one of the detector elements having a first predetermined length not being parallel to a second connecting line between a third one of the detector elements and the second detector element having a second predetermined length, and the first set of detection signals is obtained from the first and the second detector elements and the second set of detection signals is obtained from the second and third detector elements. Accordingly, by using three detector elements the above described advantages may be achieved, namely it may be determined with one measurement, in which of four segments of the plane intersecting the propagation axis, a detector is placed.

According to another advantageous example, the position determining unit is adapted to obtain the first set of detection signals with the detector having a first orientation and to obtain the second set of detection signals with the detector having a second orientation rotated with respect to the first orientation. Accordingly, the same advantages as described above may be achieved with only two detector elements measuring light from the rotating fan shaped laser beam twice with two measurements at different orientations. Similar to the above, the two orientations are preferably perpendicular to each other.

According to another advantageous example, the position determining unit is adapted to determine a repetition time interval between two detection signals from the same detector element and to determine an angular frequency of the fan shaped laser beam based thereon. Accordingly, by simply measuring the time between two detection signals from the same detector element, e.g. after a 180 degree rotation of the fan shaped laser beam, the angular velocity may be derived.

According to another advantageous example, the position determining unit is adapted to determine a first time interval between the detection signals of the first set and the second time interval between the detection signals of the second set, to determine, based on the angular velocity of the fan shaped laser beam and the first and second time intervals of a plurality of detector elements, at least two angles between the detector elements, and to determine, based on the two detector element angles and the spatial relation of the detector elements, a distance of the detector to the propagation axis. Accordingly, by determining the two angles between the detectors of the first set and the detectors of the second set the distance of the detector to the propagation axis may be determined with the knowledge of the spatial relation between the detector elements. Therefore, the detector may be moved by this distance in the direction of the propagation axis or the propagation axis may be directed on the detector, whichever is desired, to achieve an overlap of the center of the light cone produced by the rotating laser beam with the detector. Consequently, it is also possible to adjust the direction of the propagation axis automatically to the detector, since the distance to the detector and positional relation between the detector and the propagation axis, i.e. the segment in which the detector is placed, are known and may be communicated from the positioning device to a laser emitter emitting the fan shaped laser beam.

According to another advantageous example, the position determining unit is adapted to obtain a third and fourth set of detection signals with the propagation axis of the fan shaped laser beam of a laser emitter tilted by an angle with respect to the orientation of the propagation axis for obtaining the first set and second set of detection signals; to determine a third time interval between the detection signals of the third set and a fourth time interval between the detection signals of the fourth set; to determine, based on the angular velocity of the fan shaped laser beam and the third and fourth time intervals of a plurality of detector elements, two other angles between the detector elements; to determine, based on the two other detector element angles and the spatial relation of the detector elements, a second distance of the detector to the tilted propagation axis; and to determine, based on the distance and the second distance, a position of the detector with respect to the laser emitter. Accordingly, by performing two measurements with two different propagation axis orientations, the distance from the detector to the laser emitter and the distance from the laser emitter to the intersection of the propagation axis with the plane, in which the detector is located, may be obtained by simple means without previous knowledge of the rough distance between the laser emitter and the detector.

According to another advantageous example, the position determining unit is adapted to determine a reference angle of one of the detector elements with respect to a reference orientation and to determine a position of the detector relative to the propagation axis of the reference orientation based on the reference angle and the distance of the detector to the propagation axis. Accordingly, a reference coordinate system, e.g. a coordinate system aligned with the direction of the gravitational force, may be defined to obtain an absolute position of the detector.

According to another advantageous example, the detector includes at least one level sensor for indicating at least one reference orientation of the detector in space. Accordingly, the level sensor may indicate the direction of the gravitational force so that an absolute reference orientation in space may be defined that may be compared to other positions, e.g. obtained with GPS.

According to another advantageous example, the positioning device comprises a laser emitter for emitting the fan shaped laser beam rotating around the propagation axis, i.e. the laser emission axis, with the direction of rotation. Accordingly, interactions between the positioning device determining the positional relation between its detector and the propagation axis of the laser light emitted by the laser emitter and the laser emitter itself may be defined. For example, the positioning device may wirelessly communicate with the laser emitter to change its propagation axis or increase or decrease the opening angle of the light cone produced by the rotating fan shaped laser beam.

According to another embodiment, a method comprises detecting light of a fan shaped laser beam rotating around a propagation axis with a direction of rotation by a detector with at least two detector elements arranged in a known spatial relation to one another and outputting a detection signal when irradiated by the fan shaped laser beam; obtaining a first set of detection signals from the detector elements; determining at least one first time relation between the detection signals of the first set; and determining a positional relation between the detector and the propagation axis based on the first time relation. Accordingly, a positional relation between the detector and the propagation axis may be obtained so that the detector may be moved towards the propagation axis, i.e. the center of rotation on the rotation axis of the light cone as discussed above. Using the method allows that a laser beam may be automatically guided by the detector output.

According to another embodiment, a positioning system, comprises a laser emitter for emitting a fan shaped laser rotating around a propagation axis with a direction of rotation; a detector having at least two detector elements arranged in a known spatial relation to one another for outputting a detection signal when irradiated by the fan shaped laser beam; a position determining unit to obtain a first set of detection signals from the detector elements, to determine at least one first time relation between the detection signals of the first set, and to determine a positional relation between the detector and the propagation axis based on the first time relation. Accordingly, the same advantages as described above may be achieved including a co-operation between the laser emitter and the position determining unit.

According to another embodiment, a light emitting device comprises a laser emitter for emitting a fan shaped laser beam rotating around a propagation axis with a predetermined direction of rotation. Accordingly, a laser beam may be provided that can be easier detected by a detector, since the size of the laser spot is greatly increased, especially when the distance between the laser emitter and an object, on which the laser spot should be detected, is large.

According to another embodiment, a program may be provided including instructions adapted to cause data processing means to carry out a method with the above features.

According to another embodiment, a computer readable medium may be provided, in which a program is embodied, where the program is to make a computer execute the method with the above features.

According to another embodiment, a computer program product may be provided, comprising the computer readable medium.

Further advantageous features of the invention are disclosed in the claims.

DETAILED DESCRIPTION

Preferred embodiments of the invention are described with reference to the figures. It is noted that the following description contains examples only and should not be construed as limiting the invention.

Embodiments of the invention generally relate to obtaining a positional relation between a detector of a positioning device and a propagation axis or source of a laser beam, particularly of a fan shaped laser beam rotating around the propagation axis emitted by a laser emitter. Briefly said, in this process a positioning device with a detector having several detector elements is used to locate a rotating fan shaped laser beam. Generally, the laser beam will impinge on the detector elements during its rotation generating detector signals, and the characteristics of the detector signals, e.g. time sequence, time relation, etc., can be employed. For example, based on a known direction of rotation and after obtaining a time relation between detection signals from the detector elements generated by the fan shaped laser beam impinging on them, the detector is located with respect to the propagation axis of the fan shaped laser beam.

This detection can, for example, be either used to move the detector towards the center of rotation of the laser beam, as to determine the position of the detector with respect to the center of rotation of the laser beam.

Figure 1:
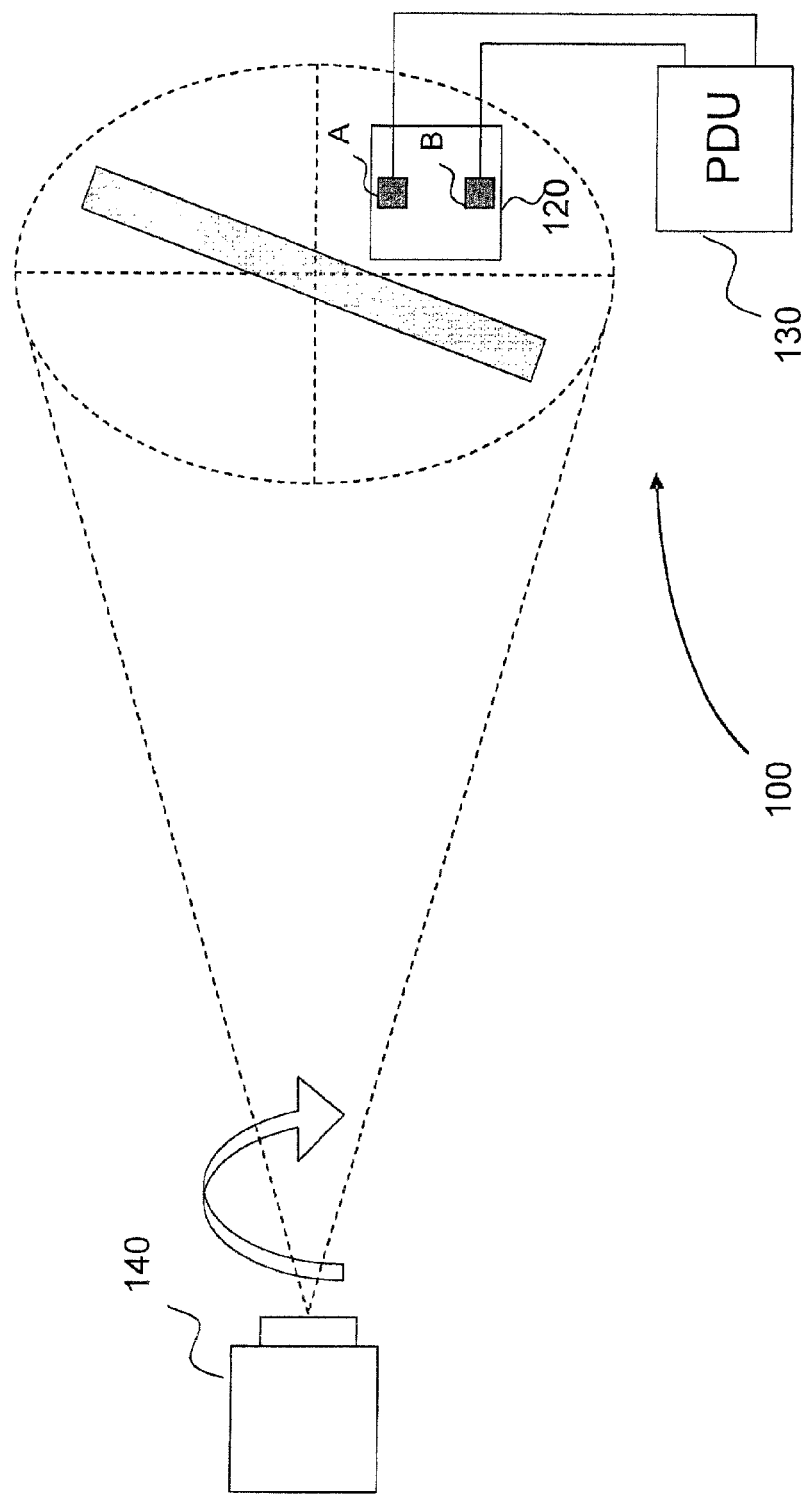
FIG. 1 illustrates a positioning device and a laser emitter according to embodiments of the invention.

FIG. 1 illustrates elements of a positioning device 100 according to an embodiment of the invention, comprising a detector 120 and a position determining unit 130.

The detector 120 detects light of a laser emitter 140. In particular, according to this embodiment, the detector 120 detects light of a fan shaped laser beam rotating around a propagation axis with a direction of rotation.

For example, the laser emitter 140 emits the fan shaped laser beam and means are provided for rotating the beam around the propagation axis. In detail, the laser emitter 140 may be part of a light emitting device, in which a rotatable cylindrical lens or another rotatable diffraction structure, such as a grating or aperture, may be provided in the laser beam for fanning the laser beam. The cylindrical lens is arranged suitably to rotate around the direction of propagation, i.e. around the propagation axis of the laser. In rotation, the fan shaped laser beam produces a cone of light with the propagation axis being the center axis of rotation.

The emitted light of the fan shaped laser beam may then be detected by the detector 120 of the positioning device 100, which can be placed at a far distance from the laser emitter 140. The detector 120 comprises at least two detector elements, for example detector element A and detector element B as shown in FIG. 1. The detector elements A and B are arranged in a known spatial relation to one another and may each output a detection signal when irradiated by the fan shaped laser beam.

The detector elements may be realized by any known photodetector, such as a photodiode, avalanche photodiode or charge coupled device (CCD) element(s).

Once light of the fan shaped laser beam is detected at one or more detector elements, one or more detection signals may be output by the detector 120 to the position determining unit (PDU) 130, as can be seen for example in FIG. 1.

The position determining unit 130 is acting as a controller and processor and may be realized by a hardware arrangement, such as by hardwired circuits, or ASICs (application specific integrated circuits) or software or any suitable combination of the above. An implementation example is given later with respect to FIG. 11. The functions performed by the position determining unit 130 will be described in the following.

As can be seen in FIG. 1, the position determining unit 130 may obtain a first set of detection signals from the detector 120 detected by the detector elements, for example, through an I/O interface.

The position determining unit 130 determines at least one first time relation between the detection signals of the first set of detection signals from the detector elements and may then determine a positional relation between the detector and the propagation axis based on the first time relation and the direction of rotation. The first time relation may implicitly already comprise the direction of rotation, since the time relation can indicate a time difference as well as time sequence, as will be described below.

For example, as can be seen in FIG. 1, when the fan shaped laser beam rotates in a clockwise direction, as indicated in FIG. 1, light will first irradiate detector element A and then detector element B. Based on this information, the position determining unit can determine that the detector 120 is placed to the right with respect to the propagation axis, i.e. the center of the circle in FIG. 1.

Therefore, a positional relation between the detector and the propagation axis is obtained so that, if the detector is placed on an object to be measured, the propagation axis may be moved in the direction of the detector. Or vice versa, if the laser beam should not be moved, the detector may be moved in the direction of the center of the cone produced by the fan shaped laser beam. For clarification of the perspective shown in FIG. 1, it is noted that the circle shown in FIG. 1 is the base part of a light cone produced by the rotating fan shaped laser beam.

In FIG. 1, the positioning device 100 is shown as two separate elements, namely the detector 120 and the position determining unit 130. However, it will be appreciated by those skilled in the art that the detector 120 and the position determining unit 130 may also be integrated in one element to form the positioning device 100.

Further, it is noted that the positioning device 100 may also comprise the laser emitter 140 which then may be regarded as a positioning system with the elements 120, 130 and 140 shown in FIG. 1 and described in detail above.

Still further, the laser emitter 140 may be part of a surveying instrument, such as a theodolite, video tacheometer, or total station or any other kind of optical instrument for determining a position of an object.

In another embodiment, the detector can be used as a 2D-layout device. For example, the detector detects certain positions, such as edge points or other characteristic features, which may be used to define a structure to be build. To be more specific, the outline of a building in the field may be defined by positions measured by the detector. Therefore, the outline of a building may be defined or planned on a field before the actual building is built.

A more detailed explanation of the functions performed by the positioning device 100 including the detector 120 and the position determining unit 130 will be described below with respect to FIGS. 2A and 2B.

Figure 2A:
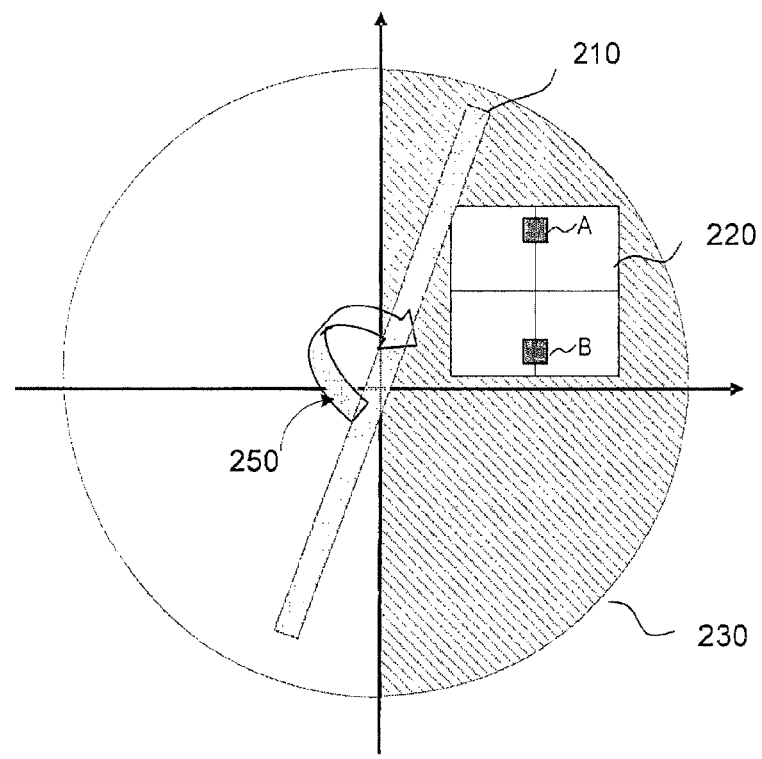
FIGS. 2A and 2B illustrate a detector of the positioning device and its operation in more detail.
Figure 2B:
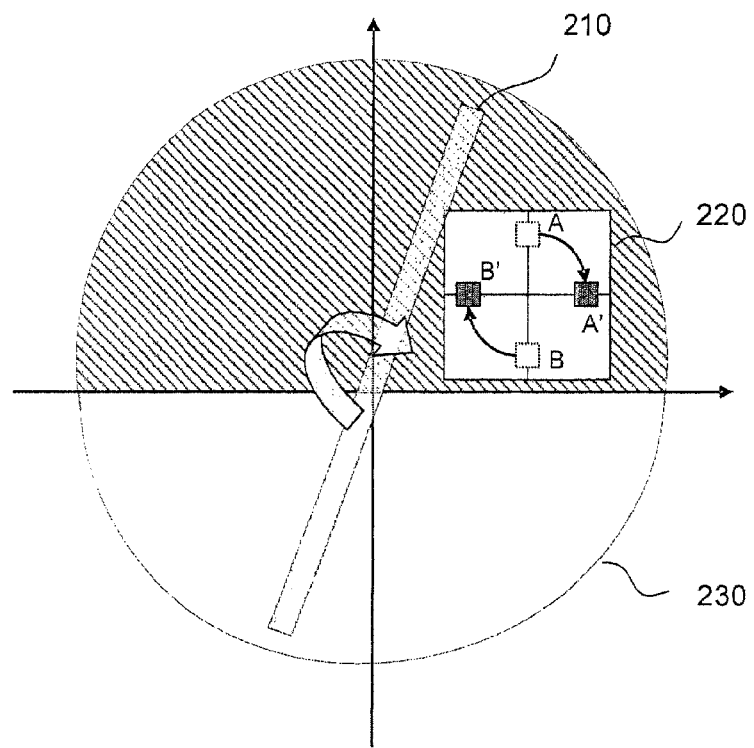

FIGS. 2A and 2B illustrate the light cone of the rotating fan shaped laser beam on a plane, in which a detector is placed.

In detail, the fan shaped laser beam 210 in FIGS. 2A and 2B is shown as a grey bar rotating in a coordinate system, in which the detector 220 with the detector elements A and B is placed. In rotation, the fan shaped laser beam 210 with its propagation axis perpendicular to the plane and intersecting the origin of the coordinate system, covers the circle indicated by reference numeral 230, which represents the base of the light cone produced by the fan shaped laser beam 210 with the center axis of rotation being the propagation axis.

As indicated above, it may be seen from FIG. 2A that when the fan shaped laser beam 210 rotates in the clockwise direction as indicated by the arrow 250, a detection signal may first be obtained from detector element A and then after a further rotation angle another detection signal may be output from detector element B. Therefore, a first set of detection signals may be obtained from detector elements A and B arranged along a first line. Thereby, it may be determined from the sequence of obtained detection signals, namely detection signal from detector element A received first and detection signal from detector element B received second, that the detector is placed in a semicircle to the right of the propagation axis which is indicated by hatching in FIG. 2A.

In addition to the first set of detection signals, the position determining unit 130 may obtain a second set of detection signals from detector elements arranged along a second line, wherein the first and second lines are not parallel with respect to one another. An example of a second set of detection signals will be described with respect to FIG. 2B.

In FIG. 2B the same fan shaped laser beam 210 with the same direction of rotation is shown covering the circle 230 in rotation. However, in contrast to FIG. 2A, the detector 220 is rotated by 90 degrees so that the detector elements A' and B' are again arranged along a line, but now along a second line in horizontal direction and not anymore vertical direction as before.

As can be seen from FIG. 2B, when the fan shaped laser beam rotates in the clockwise direction, the detector element B' is irradiated first by the laser light and outputs a detection signal and then the detector element A' is irradiated. Receiving these signals as a second set of detection signals, the position determining unit 130 may determine a second time relation between the detection signals of the second set, which indicates in this example that the detector 120 is placed in an upper semicircle with respect to the propagation axis, namely the origin of the coordinate system. Here again, the hatched semicircle indicates the semicircle determined as the area, in which the detector is placed with respect to the propagation axis.

Therefore, by combining the two measurements in FIGS. 2A and 2B, a quarter circle may be defined in which the detector 220 is located, namely the quarter circle in the upper right quadrant of the coordinate system. Consequently, the detector may be moved in the direction of the center of the coordinate system, which is where the laser beam intersects with the plane, if the laser beam would not be fanned. Furthermore, as described above, also the laser beam or the fan shaped laser beam may be moved in the direction of the detector so that automatic tracking of the detector may be realized by measuring the location of the detector, moving the laser beam in the direction of the detector and measuring the location of the detector again in a recursive manner.

In other words, as described with respect to FIG. 2A, the first time relation is a first time sequence of detection signals of the first set of detection signals and the position determining unit 130 determines one of at least two segments of a plane intersecting the propagation axis, in which the detector is located, e.g. the hatched semicircle in FIG. 2A.

Further, if additionally a second set of detection signals is obtained as described with respect to FIG. 2B, the second time relation is a second time sequence of the detection signals of the second set and the position determining unit determines one of at least four segments of the plane intersecting the propagation axis, in which the detector is located, based on the first time sequence and the second time sequence. The one of the four segments in the example of FIGS. 2A and 2B is the quarter circle hatched in both figures located in the upper right quadrant of the coordinate system.

It is noted that the detector 120 does not necessarily have to be rotated by 90 degrees but also other rotation angles of the detector elements may be used to get satisfying results.

Figure 3:
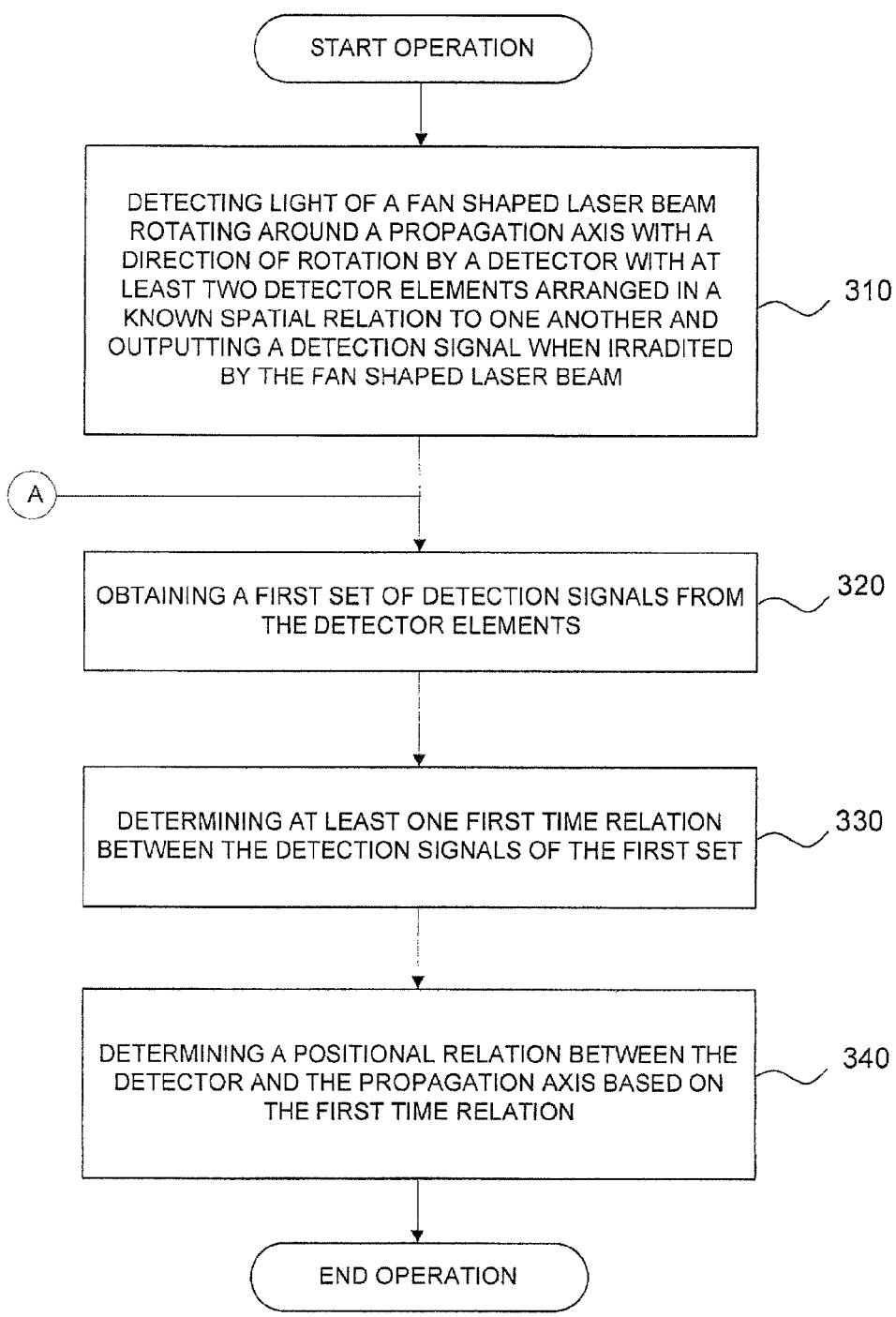
FIG. 3 illustrates operations of a method for determining a positional relation according to an embodiment of the invention.

In the following, operations of the positioning device will be described with regard to FIG. 3. FIG. 3 illustrates a flow diagram of operations of a method for obtaining a positional relation between a detector and a propagation axis of a laser beam, such as during operation of the positioning device 100 in FIG. 1.

In a first operation 310, when starting operations, a detector, e.g. the detector 120 of FIG. 1 or the detector described with respect to FIG. 5 later, detects light of a fan shaped laser beam rotating around a propagation axis with direction of rotation. As described above, the detector has at least two detector elements arranged in a known spatial relation to one another and outputs a detection signal when irradiated by the fan shaped laser beam, which may be emitted from a laser emitter, e.g. the laser emitter 140 shown in FIG. 1. Preferably, the direction of rotation of a fan shaped laser beam is known. For example, a positioning system may always use a clockwise rotation or alternatively the direction of rotation may be communicated to the positioning device from the laser emitter by either fixed line or a wireless connection, which will be described in more detail later with respect to FIG. 11.

In a subsequent operation 320, a first set of detection signals from the detector elements is obtained. In a simple case, the set comprises two detection signals, for example one detection signal from detector element A and another detection signal from detector element B of the detector 120 of FIG. 1. Then, the detection signals may be sent to the position determining unit 130 for further processing.

Processing may include, in an operation 330, determining at least one first time relation between the detection signals of the first set. For example, a time relation may be a time sequence indicating which signal has been received first and the time difference between the signals.

In an operation 340, a positional relation between the detector and the propagation axis is determined based on the first time relation and the direction of rotation. For example, as explained above, knowing the direction of rotation and the sequence of the detection signals coming from the detector elements, it may be determined where on a plane a detector is located with respect to the propagation axis. For example, as shown in FIG. 2A, the position determining unit 130 may determine that the detector is located in a semicircle positioned to the right of the propagation axis of the fan shaped laser beam.

Optionally, to further narrow down the area, in which the detector is placed, a second measurement may be performed to obtain a second set of detection signals, which has been described in detail with respect to FIG. 2B, in which the first set of detection signals has been obtained in a first orientation and the second set of detection signals has been obtained in a second orientation rotated with respect to the first orientation.

Figure 4:
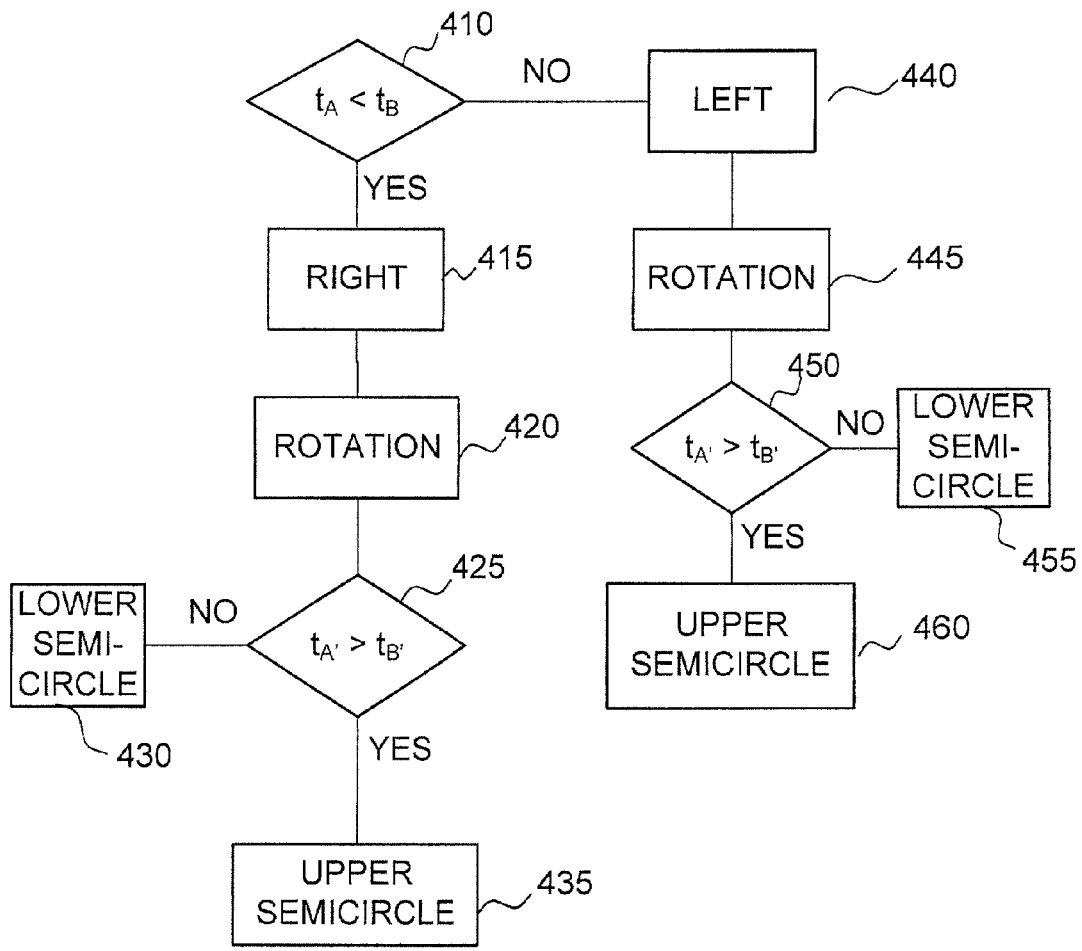
FIG. 4 illustrates operations of a method for determining the location of a detector according to a specific embodiment of the invention.

FIG. 4 illustrates a flow diagram summarizing the examples described with respect to FIGS. 2A and 2B.

In the flow diagram of FIG. 4, t denotes the time when light of the fan shaped laser beam is detected. More specifically, $t_A$ denotes the time when light is received by the detector element A and $t_B$ denotes the time when light has been received by the detector element B. Similarly, $t_{A'}$ and $t_{B'}$ are the times when light is received by detector elements A' and B', which may be the same detector elements as A and B but of a second measurement after the detector has been rotated, or may be other detector elements. It is noted that an absolute measurement of time is not necessary and the relative time between the detector elements should be sufficient to achieve the advantages of the invention.

In operation 410, it is determined whether light has been received first by detector element A, which means $t_A < t_B$.

If this is true, the flow proceeds to operation 415, in which it is determined that the detector is placed in a right semicircle with respect to the propagation axis, as can be seen in FIG. 2A. Subsequently, the flow proceeds to operation 420, in which the detector is rotated, as illustrated in FIG. 2B by, for example, 90 degrees so that the first line and the second line are perpendicular.

In the next operation 425, it is determined whether $t_{A'}$ is longer than the time $t_{B'}$. If this determination is positive, the flow proceeds to operation 435 or otherwise if negative to operation 430.

In operation 430, it is then determined that the detector is placed in a lower semicircle with respect to the propagation axis. On the other hand, in operation 435, it is determined that the detector is placed in an upper semicircle as previously discussed with respect to FIG. 2B.

With the knowledge that the detector is placed in a right semicircle and is placed in an upper semicircle with respect to the propagation axis, it follows that the detector is located in a quarter circle, namely in an upper right quadrant of the coordinate system shown in FIGS. 2A and 2B.

Considering the case in which the time $t_B$ is shorter than the time $t_A$, the determination in operation 410 is negative and the flow proceeds to operation 440. In operation 440, it is determined that the detector is in a left semicircle with respect to the propagation axis, namely the non-hatched semicircle in FIG. 2A. That means, the case described in the right arm of FIG. 4 is not shown in FIGS. 2A and 2B.

In the following operation 445, the detector is rotated, preferably by 90 degrees. In operation 450 it is determined whether time $t_{A'}$ is longer than time $t_{B'}$. If this is true, the flow proceeds to operation 460, in which it is determined that the detector is in the upper semicircle. If this is not true the flow proceeds to operation 455, in which it is determined that the detector is in the lower semicircle.

Therefore, using the simple flow shown in FIG. 4, a rough position of the detector with respect to the propagation axis may be determined so that either the detector or the laser beam may be moved with respect to each other, if desired.

Figure 5:
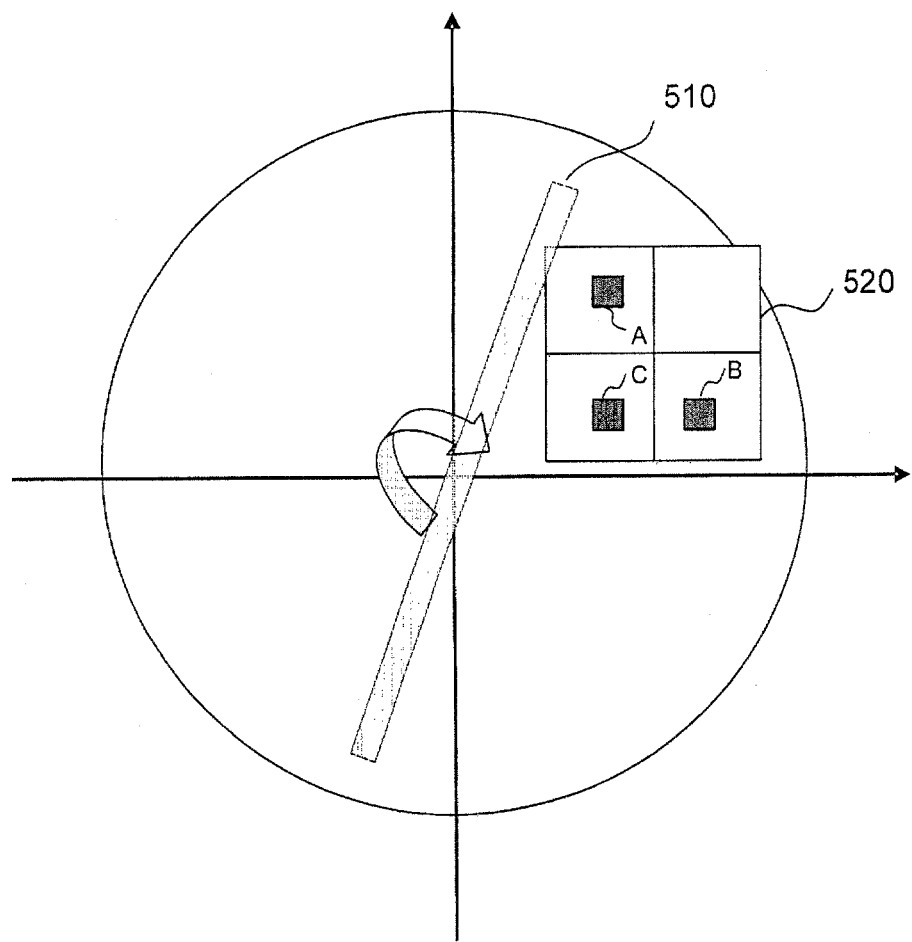
FIG. 5 illustrates another detector of the positioning device according to another embodiment of the invention.

In the following, FIG. 5 illustrates another embodiment of the invention, in which the detector comprises three detector elements.

In FIG. 5, the fan shaped laser beam is denoted with reference numeral 510 and the detector with reference numeral 520. The detector 520 comprises three detector elements, namely detector element A, detector element B and detector element C. Similar to the above, a detector element may be by any known photodetector, such as a photodiode, avalanche photodiode or charge coupled device (CCD) element(s).

In the herein described example, the detector 520 comprises three detector elements, a first connecting line between a first detector element A and a second detector element C having a first predetermined length a, and a second connecting line between a third detector element B and the second detector element C having a second predetermined length b, wherein the first and the second connecting lines are not parallel. Here, the first set of detection signals is obtained from the first and the second detector elements A and C and the second set of detection signals is obtained from the second and the third detector elements C and B.

It is noted that the three detector elements are preferably oriented as shown in FIG. 5, i.e. detector elements A and C in a first vertical line and detector elements C and B in a second horizontal line perpendicular to the vertical line.

Therefore, the position determining unit may obtain the first set of detection signals with the detector having a first orientation and the second set of detection signals with the detector having a second orientation without a rotation necessary. However, it is noted that this case leads to the same information as using only two detector elements but two measurements, wherein the two detector elements are rotated from a first orientation to a second orientation. Further, those skilled in the art will appreciate that various orientations exist to achieve the advantageous of the invention and that the detector is not limited to two or three detector elements.

Similar to the above, it may also be seen from FIG. 5 that when a detection signal is first detected by detector element A, then a detection signal is detected by detector element C and finally a detection signal is detected by detector element B, it may be determined that the detector is placed in a quarter circle in the upper right quadrant of the coordinate system shown in FIG. 5.

Until now, examples have been described, in which the rough location of a detector in a coordinate system is determined. However, the positioning device and positioning method described herein may further be adapted to determine the exact position of a detector, which will be described in the following with respect to FIG. 6.

To derive the exact position, the angular velocity ω of the rotating fan shaped laser beam may be used. The angular velocity may be obtained directly from the laser emitter, or more specifically from the rotation speed of the cylindrical lens placed in front of the laser emitter, which has been described above.

Furthermore, the angular velocity of the fan shaped laser beam may also be determined by the position determining unit itself by determining a repetition time interval between two detection signals from the same detector element.

For example, consider detector element A and a clockwise rotation of the fan shaped laser beam, it can be seen from FIG. 5 or also from FIGS. 1, 2A, and 2B, that when the angular velocity is constant, a time difference between two detection signals from detector element A corresponds to a rotation of the fan shaped laser beam by 180 degrees. Therefore, the angular velocity may easily be derived by the detector without any knowledge of the rotating cylindrical lens.

In short, the position of the detector in the coordinate system shown in FIG. 5 with the center of rotation of the light cone of the fan shaped laser beam being the origin, may be derived as follows.

Figure 6:
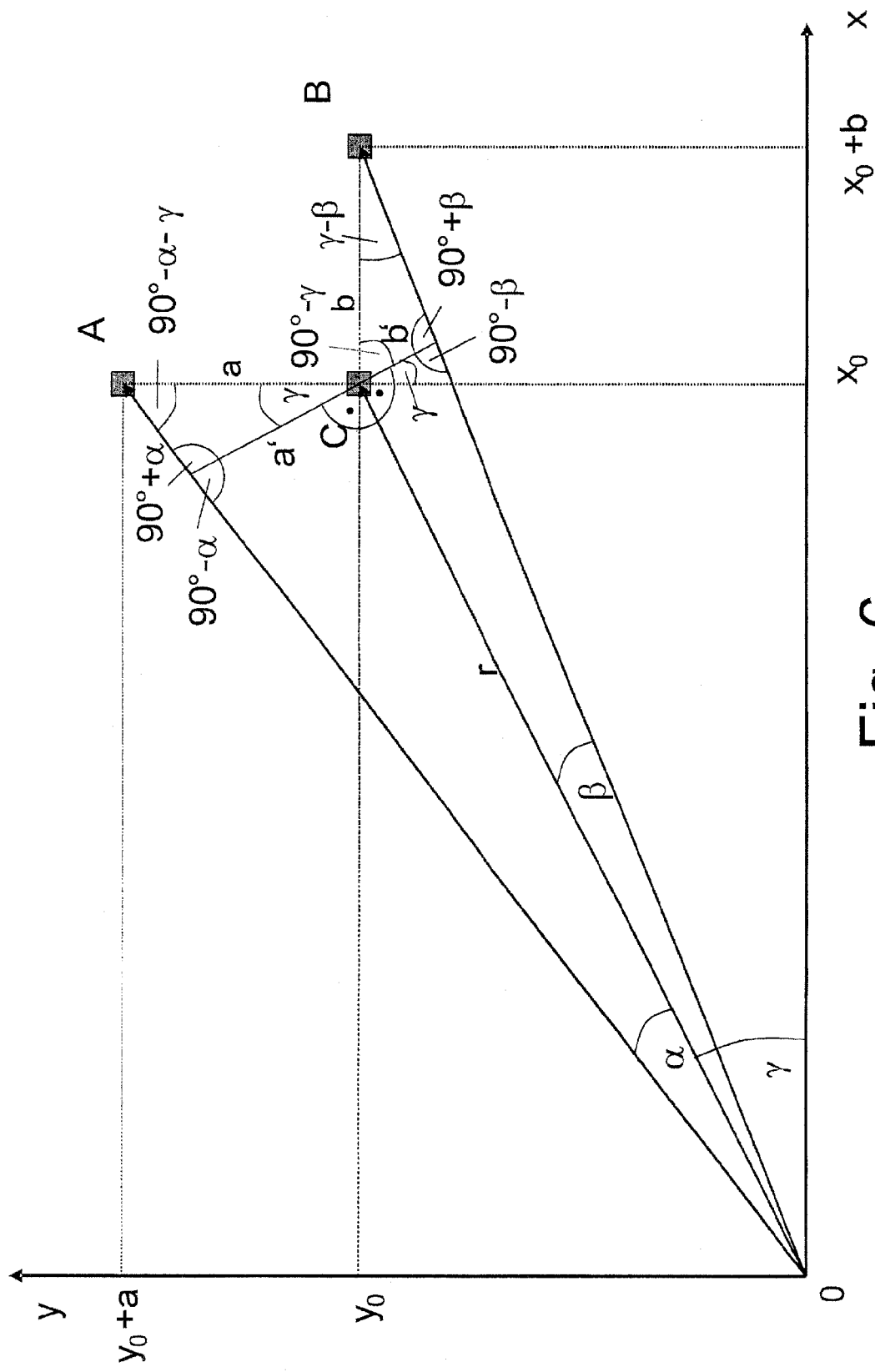
FIG. 6 illustrates a diagram for explaining how a positional relation between a detector and a propagation axis may be determined.

First, the position determining unit determines a first time interval between the detection signals of the first set and a second time interval between the detection signals of the second set. In the example of FIG. 6, the first time interval is obtained from the detection signals from detector element A and detector element C and the second time interval is obtained from the detection signals from the detector element C and the detector element B.

Then, the position determining unit may determine two angles, based on the angular velocity of the fan shaped laser beam and the first and second time intervals obtained from the corresponding detector elements. These two angles correspond to the angles α and β in FIG. 6, which may easily be derived when knowing the time needed for example for a 180 or 360 degree rotation, i.e. the angular velocity, and the time the fan shaped laser beam needs from detector element A to B and the time from detector element C to B.

As will be show in detail mathematically in the following, based on the two angles and the spatial relation of the detector elements, namely their lengths a and b, a distance of the detector to the propagation axis may be derived.

FIG. 6 illustrates a diagram with an x-y-coordinate system, in which the origin of the coordinate system is the center of rotation, namely the intersection of a plane, in which a detector is located, with the propagation axis. The detector in FIG. 6 is exemplified by the detector elements A, B and C, wherein the line between A and C has a length a and the line between detector elements C and B has a length b.

In the following mathematical derivation of the position of the detector it is assumed for simplification that the length a equals the length b and that the first connecting line between a and c is parallel to the y-axis and the second connecting line between C and B is parallel to the x-axis. Further, the angular velocity ω is assumed to be constant.

Below it is shown how $x_0$ being the distance in x-direction between detector element C and the origin and $y_0$ being the distance in the x-direction between the detector element C and the origin are obtained from the angles α and β and the length between the detector elements a.

The calculation is as follows:

$$\tan\alpha = \frac{a'}{r} \quad (1)$$

$$\tan\beta = \frac{b'}{r}$$

$$\rightarrow \frac{a'}{b'} = \frac{\tan\alpha}{\tan\beta}$$

With the law of sine and sum formula:

$$\frac{a'}{a} = \frac{\sin(90° - \alpha - \gamma)}{\sin(90° + \alpha)} = \frac{\sin(90° - \delta)}{\sin(90° + \alpha)} \quad (\delta = \alpha + \gamma) \quad (2)$$

$$\frac{a'}{a} = \frac{\sin 90° \cos\delta - \sin\delta\cos 90°}{\sin 90° \cos\alpha + \sin\alpha\cos 90°} = \frac{\cos\delta}{\cos\alpha} = \frac{\cos(\alpha + \gamma)}{\cos\alpha}$$

$$\frac{a'}{a} = \frac{\cos\alpha\cos\gamma - \sin\alpha\sin\gamma}{\cos\alpha}$$

$$= \cos\gamma - \frac{\sin\alpha}{\cos\alpha}\sin\gamma$$

$$= \cos\gamma - \tan\alpha\sin\gamma$$

$$a' = a(\cos\gamma - \tan\alpha\sin\gamma) \quad (3)$$

$$\frac{b'}{a} = \frac{\sin(\gamma - \beta)}{\sin(90° + \beta)}$$

$$\frac{b'}{a} = \frac{\sin\gamma\cos\beta - \sin\beta\cos\gamma}{\sin 90° \cos\beta + \sin\beta\cos 90°}$$

$$= \sin\gamma - \frac{\sin\beta}{\cos\beta}\cos\gamma$$

$$= \sin\gamma - \tan\beta\cos\gamma$$

$$b' = a(\sin\gamma - \tan\beta\cos\gamma)$$

(2):(3)=(1), that means substituting equations (2) and (3) into equation (1) leads to $$\frac{a'}{b'} = \frac{a(\cos\gamma - \tan\alpha\sin\gamma)}{a(\sin\gamma - \tan\beta\cos\gamma)} = \frac{\tan\alpha}{\tan\beta} \quad (4)$$

$$\tan\alpha\sin\gamma - \tan\alpha\tan\beta\cos\gamma = \tan\beta\cos\gamma - \tan\beta\tan\alpha\sin\gamma$$

$$\sin\gamma(\tan\alpha + \tan\alpha\tan\beta) = \cos\gamma(\tan\beta + \tan\alpha\tan\beta)$$

$$\frac{\sin\gamma}{\cos\gamma} = \tan\gamma = \frac{\tan\beta + \tan\alpha\tan\beta}{\tan\alpha + \tan\alpha\tan\beta}$$

$$\tan\gamma = \frac{\left(\frac{1}{\tan\alpha} + 1\right)}{\left(\frac{1}{\tan\beta} + 1\right)}; \gamma = \arctan\frac{\left(\frac{1}{\tan\alpha} + 1\right)}{\left(\frac{1}{\tan\beta} + 1\right)} \quad (5)$$

$$\tan\gamma = \frac{y_0}{x_0}$$

$$y_0 = x_0 \tan\gamma$$

$$\tan(\alpha + \gamma) = \frac{y_0 + a}{x_0} \quad (6)$$

(5) in (6)

$$\tan(\alpha + \gamma) = \frac{x_0 \tan\gamma + a}{x_0} \quad (7)$$

$$x_0 = \frac{a}{\tan(\alpha + \gamma) - \tan\gamma}$$

(4) in (7)

$$x_0 = \frac{a}{\tan\left(\alpha + \arctan\left(\frac{\frac{1}{\tan\alpha}+1}{\frac{1}{\tan\beta}+1}\right)\right) - \frac{\frac{1}{\tan\alpha}+1}{\frac{1}{\tan\beta}+1}} \quad (8)$$

$$y_0 = x_0 \frac{\frac{1}{\tan\alpha}+1}{\frac{1}{\tan\beta}+1} \quad (9)$$

As can be seen from equations (8) and (9), these equations only dependent on the angles α and β and the length a, which is given by the detector geometry.

As described above, the angles α and β may be easily calculated by knowing the angular velocity of the fan shaped laser beam and the time difference between light detected by detector element A and light detected by detector element C and the time difference between light detected by detector element C and light detected by detector element B, respectively.

In the following, an example is given to check the equations (8) and (9). Here it is assumed that $x_0$=1000 mm, $y_0$=250 mm and a=30 mm, and α and β are wanted.

$$\varepsilon = \gamma - \beta$$

$$\tan\varepsilon = \frac{y_0}{x_0 + a} \rightarrow \varepsilon$$

$$= \arctan\left(\frac{y_0}{x_0 + a}\right)$$

$$= \arctan\left(\frac{250 \text{ mm}}{1000 \text{ mm} + 30 \text{ mm}}\right)$$

$$= 13{,}6429148°$$

$$\tan\gamma = \frac{y_0}{x_0} \rightarrow \gamma = \arctan\left(\frac{y_0}{x_0}\right) = \arctan\left(\frac{250 \text{ mm}}{1000 \text{ mm}}\right) = 14{,}03624347°$$

$$\beta = \gamma - \varepsilon = 14{,}03624347° - 13{,}6429148° = 0{,}393328667°$$

$$\tan(\alpha + \gamma) = \frac{y_0 + a}{x_0} \rightarrow \alpha + \gamma$$

$$= \arctan\left(\frac{y_0 + a}{x_0}\right)$$

$$= \arctan\left(\frac{250 \text{ mm} + 30 \text{ mm}}{1000 \text{ mm}}\right)$$

$$= 15{,}64224646°$$

$$\alpha = 15{,}64224646° - \gamma$$
$$= 15{,}64334646° - 14{,}03624347°$$
$$= 1{,}60600299°$$

The obtained results for the angles α and β may then be plugged in equations (8) and (9) to check their validity.

For $x_0$ it may found $$x_0 = \frac{a}{\tan\left(\alpha + \arctan\left(\frac{\frac{1}{\tan\alpha}+1}{\frac{1}{\tan\beta}+1}\right)\right) - \frac{\frac{1}{\tan\alpha}+1}{\frac{1}{\tan\beta}+1}}$$

-continued $$\frac{30 \text{ mm}}{\tan\left(1{,}60600299° + \arctan\left(\frac{\frac{1}{\tan 1{,}60600299°}+1}{\frac{1}{\tan 0{,}393328667°}+1}\right)\right) - \frac{\frac{1}{\tan 1{,}60600299°}+1}{\frac{1}{\tan 0{,}393328667°}+1}} = 1000 \text{ mm}$$

As described above, it has been assumed that the first connecting line and the second connection line are parallel to the x-axis and y-axis, respectively.

Therefore, a relative position, namely a position in a coordinate system defined by the connecting lines of the detector elements is achieved.

Further, it may be desired to obtain the position in another reference coordinate system, for example a reference coordinate system using the gravitational force as one axis.

In one embodiment, the position determining unit determines a reference angle of one of the detector elements with respect to a reference orientation, and determines a position of the detector relative to the propagation axis and the reference orientation based on the reference angle and the distance of the detector to the propagation axis.

For example, as described above the reference orientation may have the same direction as the gravitational force or may be perpendicular to the gravitational force so that a reference coordinate system may be used that is comparable to other known reference coordinate systems, such as the one used in a global positioning system (GPS). A level sensor may be used for indicating at least one reference orientation of the detector in space, for example. The level sensor may be provided in the detector as will be later described in FIG. 11.

In the flowchart described below with respect to FIG. 7, the operations of the above described calculation are summarized by referring to the position determining unit 130 and the detector shown in FIG. 6.

It will be appreciated by those skilled in the art that equivalent results to the results obtained with the detector shown in FIG. 6 with three detector elements may also be obtained with the detectors 120, 220 shown in FIGS. 1, 2A and 2B by rotating this detector 120, 220 as shown in FIG. 2B.

Figure 7:
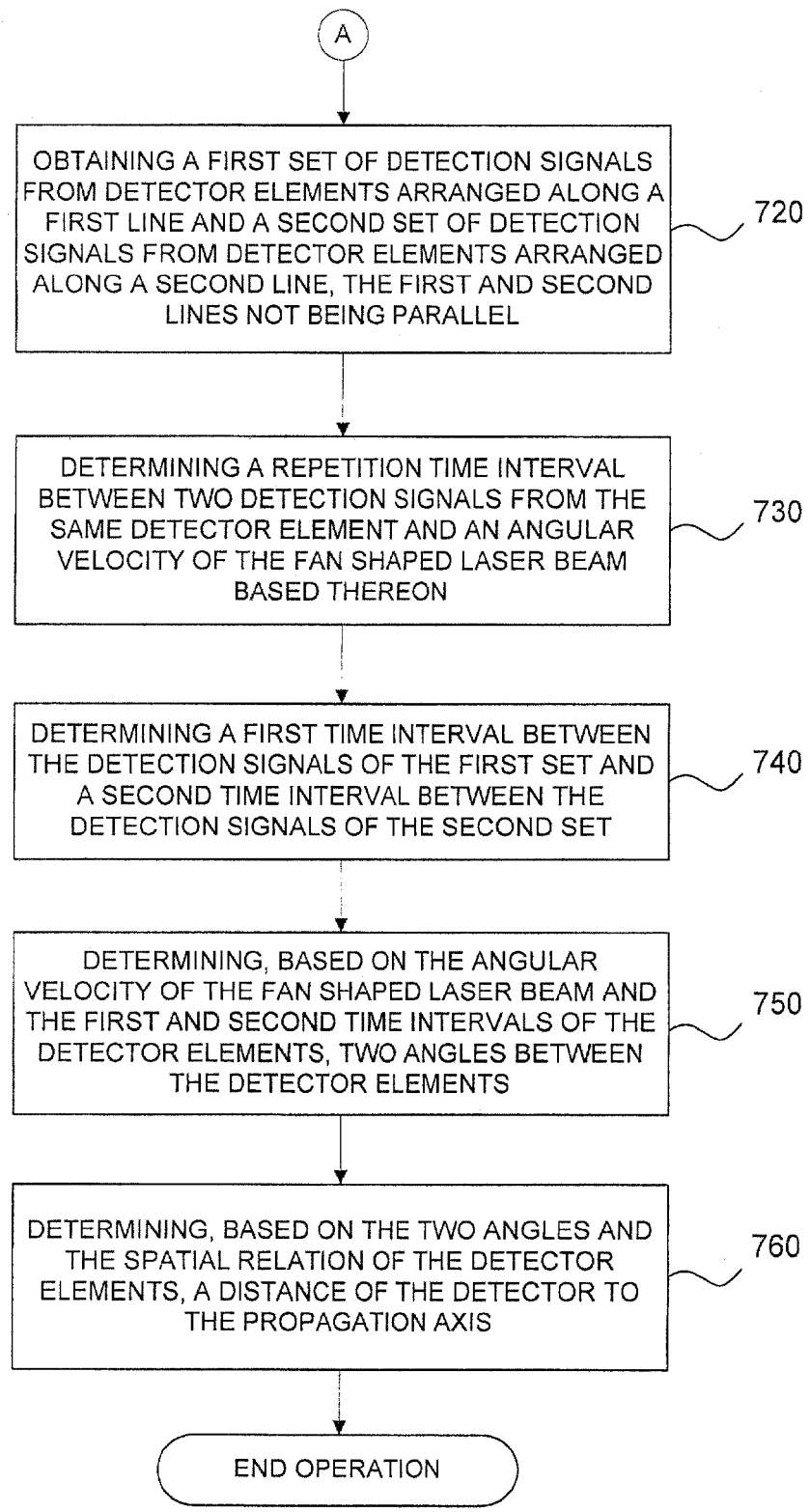
FIG. 7 illustrates operations of a method for obtaining a distance between a detector and the propagation axis of a laser beam according to another embodiment of the invention.

The first operation in the embodiment described with respect to FIG. 7 is operation 310, previously described with respect to FIG. 3. In this operation light of a fan shaped laser beam rotating around the propagation axis is detected with at least two detector elements arranged in a known spatial relation to one another. As discussed in the following, it is equivalent whether two measurements with two detector elements are taken at a different angle with respect to another or whether a detector with three elements is used.

In an operation 720, a first set of detection signals from detector elements arranged along a first line and a second set of detection signals from detector elements arranged along a second line are obtained. Preferably, the first and second lines are perpendicular with respect to each other, which is for example the case for detector 520 of FIG. 5 or the detector shown in FIG. 6.

In a subsequent operation 730, a repetition time interval between two detection signals from the same detector element is determined to obtain the angular velocity of the fan shaped laser beam. Details of this operation have been described above, and it is referred to the above explanation to avoid unnecessary repetition.

In operation 740, a first time interval between the detection signals of the first set and a second time interval between the detection signals of the second set are determined. For example, the first time interval may be the time interval between the detection signal from detector element A when light hits this detector element and the detection signal from detector element C when light hits the detector element C. The second time interval may be correspondingly obtained from the detection signals from detector elements C and B when light of the fan shaped laser beam hits these elements.

In operation 750, two angles, e.g. α and β of FIG. 6, may be determined based on the above angular velocity and the first and second time intervals.

As shown in detail above, in a calculation of the position of the detector, the two angles and the spatial relation of the detector elements may be used in operation 760 to determine a distance of the detector to the propagation axis, i.e. a relative position to the propagation axis in a coordinate system having the propagation axis as origin.

Figure 8:
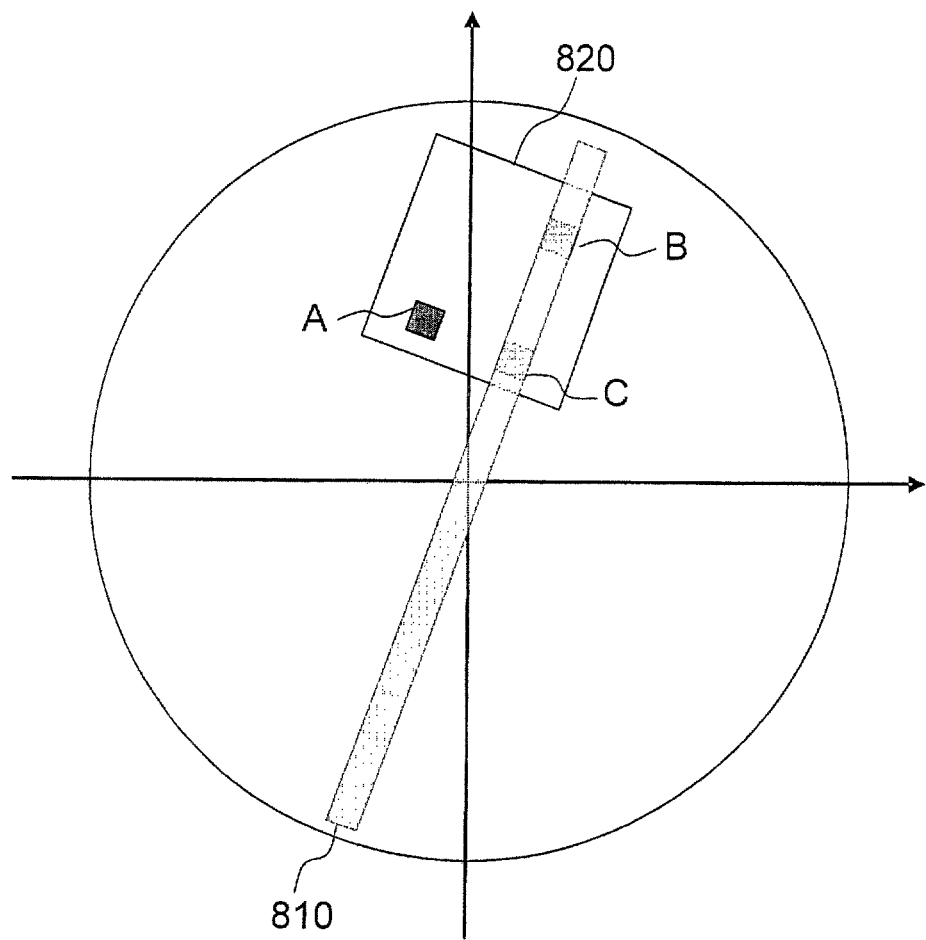
FIG. 8 illustrates a position of a detector with respect to the fan shaped laser beam according to a specific embodiment of the invention.

FIG. 8 illustrates a specific embodiment to easily derive the distance between the center of rotation, i.e. the propagation axis, and the detector.

In FIG. 8, the fan shaped laser beam is denoted with reference numeral 810 and the detector comprising the detector elements A, C and B is denoted with reference numeral 820.

Figure 9:
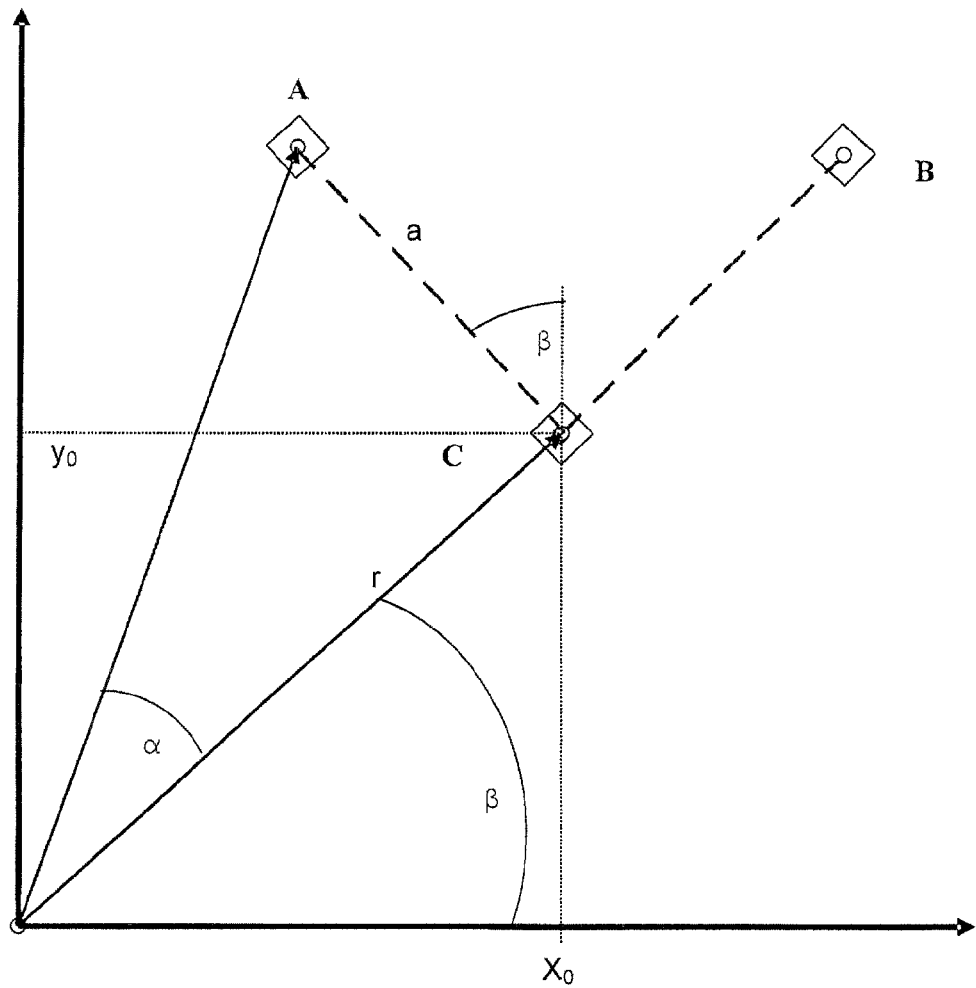
FIG. 9 illustrates a diagram explaining the embodiment shown in FIG. 8 in more detail.

As will be seen with respect to FIG. 9, it is important in this embodiment that the connecting line between detector elements A and C is perpendicular to the fan shaped laser beam as shown in FIG. 8. Such an orientation may be easy to achieve with a detector having three detector elements with their connecting lines being perpendicular with respect to each other as shown in FIG. 8. For example, from the geometry of detector 820, it can be derived that if two detection signals from detector elements C and B are outputted concurrently, both detectors are placed on the fan shaped laser beam at the same time and the first connecting line between detector elements A and C is perpendicular with respect to the fan shaped laser beam.

In other words, the time difference from detector signals from the detector elements C and B is zero and the time difference between detection signals from detector elements A and C corresponds to the angle α shown in FIG. 9.

In more detail, FIG. 9 shows the geometrical relationship between the detector elements and the coordinate system, and the distance r between detector element C and the origin of the coordinate system, which may be the center of rotation of the light cone, wherein the axis of rotation is the previously described propagation axis, perpendicular to the plane.

Using the geometrical relationships shown in FIG. 9, a distance r may easily be obtained by $$\tan\alpha = \frac{a}{r} \text{ which leads to } r = \frac{a}{\tan\alpha},$$

wherein the length a is known and a may be calculated with the knowledge of the angular velocity using the time difference between the time of the detection signals from detector elements A and C.

As can be seen above, in the calculation with respect to FIGS. 8 and 9 knowledge about the direction of rotation is not necessary to calculate the distance r.

In the described embodiments, the time may be measured in the position determining unit according to the generation and arrival of the detection signals or may even be already determined in a detector element itself by providing the signal from the detector element to the position determining unit with a time stamp, to name a few of possible methods for time measurement.

Further, $x_0 = r\cos\beta$ and $y_0 = r\sin\beta$, as can be seen in FIG. 9, may be obtained with angle β, which may be measured by a grade sensor.

Before, measurements of the distance from the detector to the laser propagation axis have been described. In the following embodiment, a position of the detector with respect to the laser source, e.g. the laser emitter of FIG. 1, is described with respect to FIGS. 10A and 10B.

Figure 10A:
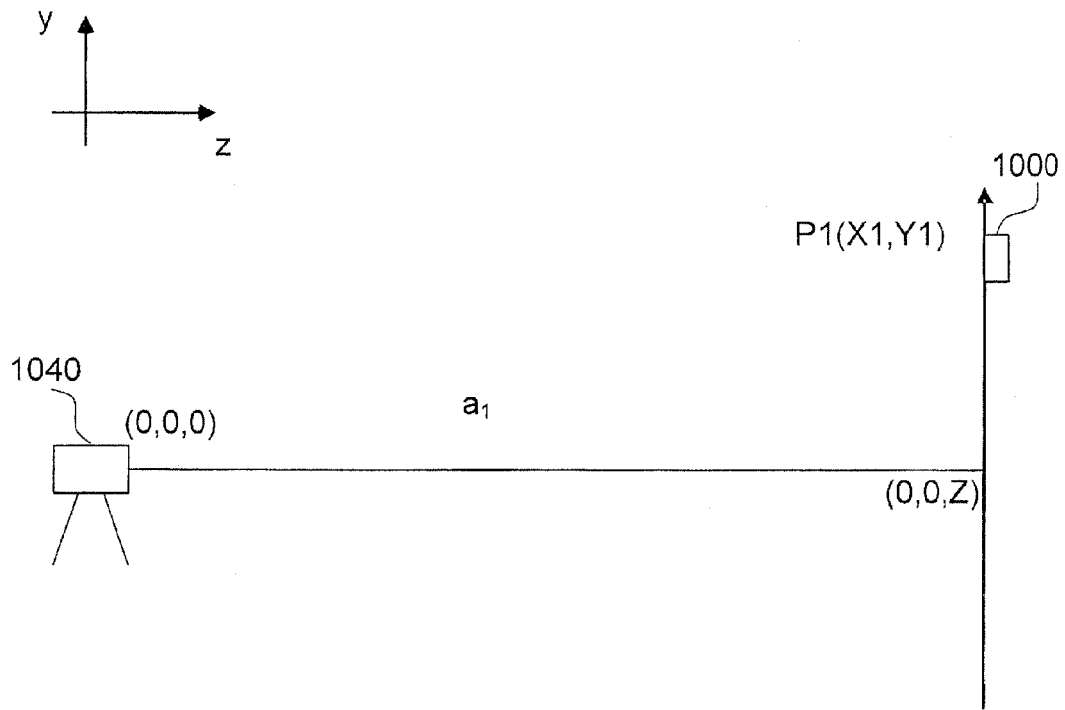
FIGS. 10A and 10B illustrate a change in the arrangement of the propagation axis for obtaining a position of a detector with respect to a laser emitter according to another embodiment of the invention.

In FIG. 10A a laser emitter 1040, which may be any suitable laser used for surveying instruments, and a detector 1000 at a position X1, Y1 are shown. It is noted that according to the invention, since detectors for detecting the laser beam are used and not the naked eye, the laser emitter is not limited to visible light but also infrared light may be used which is not seen with the eye but may be detected by a detector.

Figure 10B:
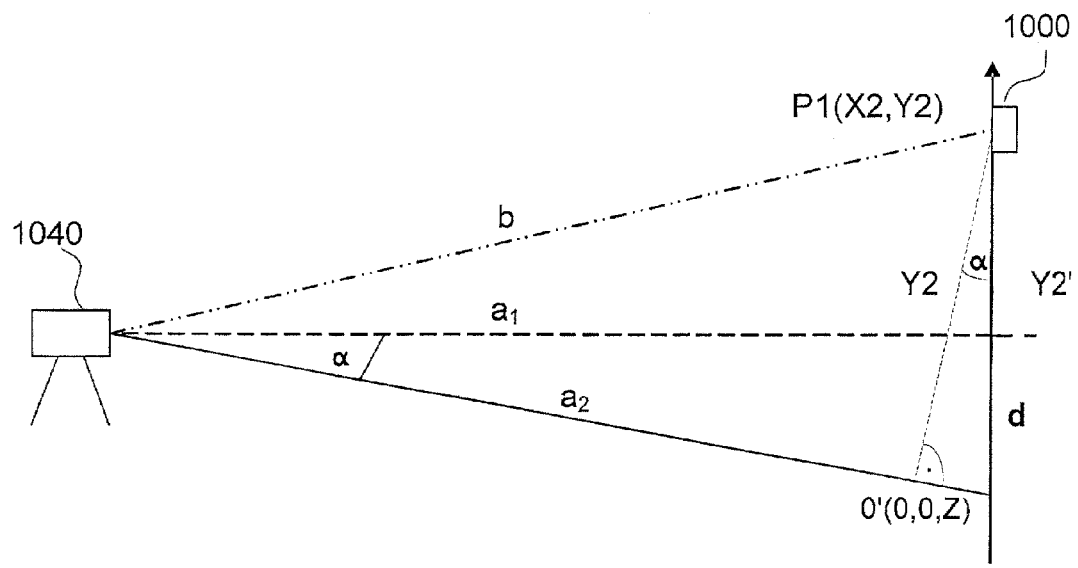

In contrast to the previous FIGS. 2A, 2B, FIG. 5, FIG. 6, FIG. 8 and FIG. 9 all showing an x-y-plane of a coordinate system, in FIGS. 10A and 10B a y-z-plane is shown.

At first, the positioning device determines the coordinates X1 and Y1 to the intersection between the center of rotation and the plane, in which the detector is placed. This may be done as described above by obtaining a first and second set of detection signals and determining a first and a second time interval between the detection signals to obtain two angles between the detector elements.

Next, as can be seen in FIG. 10B, the propagation axis of the laser emitter 1040 is tilted by a known angle. Here, the whole laser emitter may be tilted or simply a mirror or prism may be used to tilt the propagation axis.

Then, the position X2, Y2 with respect to the new orientation of the tilted propagation axis, namely the position with respect to the new origin O', may be derived as follows.

A third and fourth set of detection signals with the propagation axis of the fan shaped laser beam of the laser emitter 1040 tilted by an angle with respect to the orientation of the propagation axis when obtaining the first set and second set of detection signals are obtained.

Subsequently, a third time interval between the detection signals of the third set and a fourth time interval between the detection signals of the fourth set may be determined to derive two other angles between the detector elements using the angular velocity of the fan shaped laser beam so that a second distance from the detector to the tilted propagation axis, namely Y2, may be obtained.

It is noted that the calculation of Y2 is equivalent to the calculation of Y1, which has been described in detail with respect to FIG. 6, wherein in the present embodiment the x-coordinate does not have to be used.

As can be seen from the simple geometrical relationships in FIGS. 10A and 10B, the distance d may be calculated by d=Y2'-Y1, wherein Y2'=Y2/cos(α). When the angle α is small, which is usually the case for a large distance $a_1$, the difference between Y2' and Y2 may be negligible.

Knowing the angle of tilt, α in FIG. 10B, the distance $a_1$ may be obtained by $a_1 = d/\tan(\alpha)$, wherein the distance b between detector and laser emitter may be obtained using Pythagoras' theorem leading to $$b = \sqrt{(a_1^2 + Y1^2)}$$

Therefore, the distance b between detector and laser emitter is obtained by determining two positions of the detector 1000 with respect to two different orientations of the propagation axis.

Figure 11:
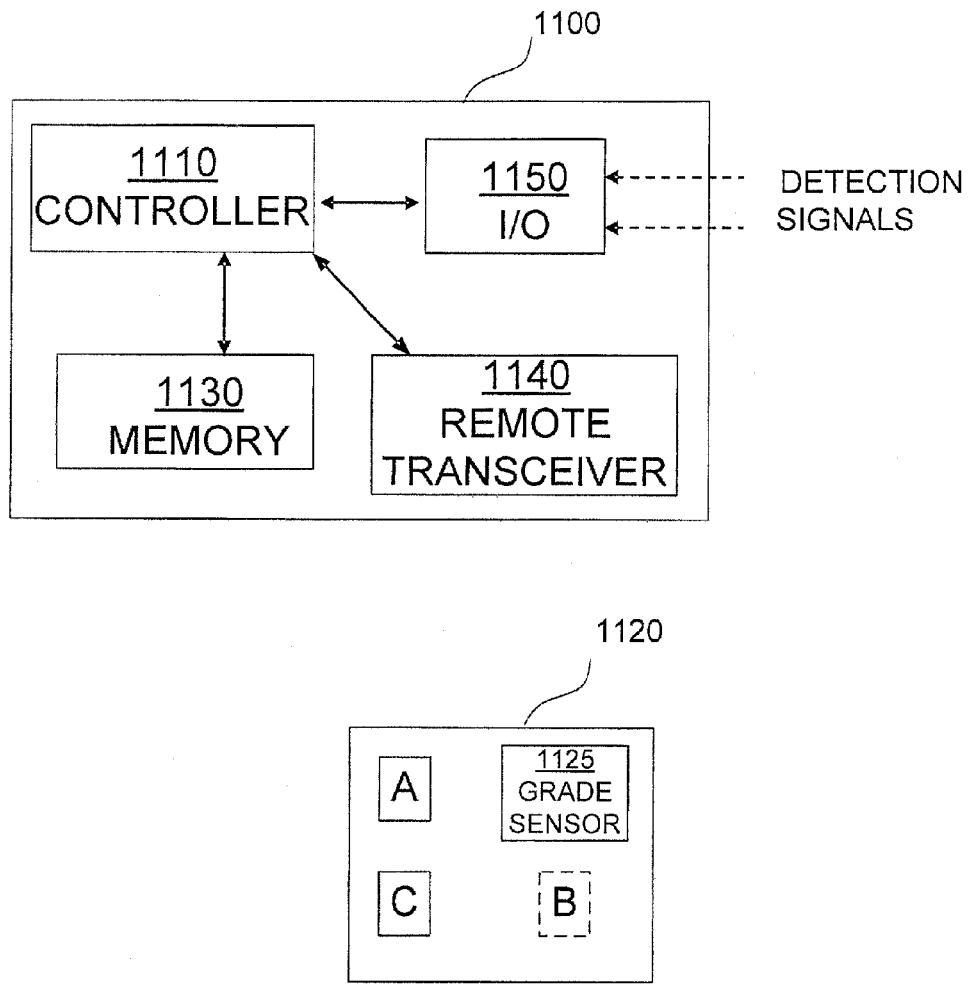
FIG. 11 illustrates elements of a position determining unit and a detector according to an embodiment of the invention.

In the following, FIG. 11 is described. FIG. 11 illustrates elements of a position determining unit and a detector according to an embodiment of the invention.

In detail, the position determining unit 1100 of FIG. 11 comprises a controller 1110, a memory 1130, and an I/O interface 1150. Optionally, the position determining unit 1100 may also comprise a remote transceiver 1140 which will be discussed in more detail later.

The detector 1120 comprises at least two detector elements A and C. Optionally, there may be more detector elements provided, such as detector element B. Further, in one embodiment, the detector 1120 may also comprise a grade sensor 1125 to indicate a reference orientation, for example the direction of the gravitational field of the earth.

As described above, the positioning device may comprise the position determining unit 1100 and the detector 1120 as two separate units or the position determining unit 1100 and the detector 1120 may be integrated in one unit or only single elements of the detector may be integrated in the position determining unit.

The controller 1110 may be realised by any kind of processing means, a microprocessor, computer, field programmable gate array (FPGA) or integrated circuit, such as an application specific integrated circuit (ASIC) but are not limited thereto. For example, the controller 1110 may have a processor running several software elements, for example, software elements corresponding to the functions described in the operations of the methods above.

The memory 1130 may be any suitable or desirable storage device and may be one or a combination of several of the following components, a RAM, a ROM, a hard disk, an (E)EPROM, a disc, a flash memory, etc. A flash memory may be suitable to export or import program code. The program code stored in the memory 1130 may be a program including instructions adapted to cause the data processing means of the controller 1110 to carry out operations of the method described above.

The I/O interface 1150 may be adapted to receive detection signals from the detector 1120. Further, it is also feasible that the position determining unit 1100 and the detector 1120 communicate other information, such as starting the detection, stopping the detection and providing grade sensor information to the position determining unit 1100.

Therefore, as described above, the controller 1110 may receive detection signals from the detector 1120 through the I/O interface 1150 and may carry out the operations of the above-described methods by referring to the memory 1130 including the corresponding instructions.

Furthermore, a remote transceiver 1140 may be included in the position determining unit 1100 to communicate with an instrument comprising the laser emitter, such as a light emitting device or a surveying instrument. For example, another transceiver of a surveying instrument for communication with the transceiver 1140 of the position determining unit 1100 in the positioning device may be provide with instructions for the surveying instrument to change the laser beam position so that the laser beam of the surveying instrument may be automatically steered towards the detector 1120. The communication between the surveying instrument and the positioning device may be realised physically by fixed lines or by a wireless connection, such as radio, WLAN, e.g. IEEE 802.11 or Bluetooth or any other suitable wireless connection.

It will be appreciated by those skilled in the art that the controller, e.g. including any type of processor, can take the form of various combinations of processors and operating systems or a stand alone device. Further, the methods may be implemented on a data processing computer, such as a personal computer, workstation computer, main frame computer or other computer running an operating system such as Microsoft Windows and Windows 2000, available from Microsoft Corporation of Redmond, Wash./USA or Solaris available from Sun Microsystems, Inc. of Santa Clara, Calif./USA or various versions of the Unix operating systems such as Linux available from a number of vendors.

According to another embodiment, a program may be provided including instructions adapted to cause a data processor that may be part of the controller 1110 to carry out combinations of the above-described operations.

The program or elements thereof may be stored in a memory, such as a ROM or RAM or other suitable storage device, for example the memory 1130 of FIG. 11, and retrieved by the data processor for execution.

Moreover, a computer readable medium may be provided in which the program is embodied. The computer readable medium may be tangible, such as a disc or other data carrier are may be constituted by signals suitable for electronic, optic or any other type of transmission. A computer program product may comprise the computer readable medium.

The above embodiments and examples of the invention may allow performing detection of a laser beam and obtaining a positional relation between the laser beam and detector for different purposes. For example, as explained above, the invention may be applied to surveying, wherein a surveying instrument is provided with a laser emitter and the light of which is detected and analyzed by the positioning device thus realizing an automated surveying system. Therefore, fast and easy detection and automation of this process may be achieved.

It should be understood that operations described herein are not inherently related to any particular device or unit and may be implemented by any suitable combination of components. The devices, system and units described in detail above constitute preferred embodiments to perform the operations of the described methods. However, this may not be limited to the same.

It will be apparent to those skilled in the art that various modifications and variations can be made in the devices, system, units and methods of the invention as well as in the construction of this invention without departing from the scope of or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A positioning device, comprising:
   a detector for detecting light of a fan shaped laser beam rotating around a propagation axis with a direction of rotation and having at least two detector elements (A, B) arranged in a known spatial relation to one another for outputting a detection signal when irradiated by the fan shaped laser beam; and a position determining unit adapted to
  obtain a first set of detection signals from the detector elements wherein the first set of detection signals is obtained from detector elements arranged along a first line,
  determine at least one first time relation between the detection signals of the first set,
  determine a positional relation between the detector and the propagation axis based on the first time relation,
  obtain a second set of detection signals from detector elements arranged along a second line, the first and second lines not being parallel with respect to one another,
  determine at least one second time relation between the detection signals of the second set,
  determine a repetition time interval between two detection signals from the same detector element and to determine an angular velocity (ω) of the fan shaped laser beam based thereon,
  determine a first time interval between the detection signals of the first set and a second time interval between the detection signals of the second set,
  determine, based on the angular velocity of the fan shaped laser beam and the first and second time intervals of a plurality of detector elements, two angles between the detector elements, and
  determine, based on the two detector element angles and the spatial relation of the detector elements, a distance of the detector to the propagation axis.

2. The positioning device according to claim 1, wherein the first time relation is a first time sequence of the detection signals of the first set and wherein the position determining unit is adapted to determine one of at least two segments of a plane intersecting the propagation axis, in which the detector is located.

3. The positioning device according to claim 2, wherein the second time relation is a second time sequence of the detection signals of the second set and wherein the position determining unit is adapted to determine one of at least four segments of the plane intersecting the propagation axis, in which the detector is located, based on the first time sequence and the second time sequence.

4. The positioning device according to claim 1, wherein the detector includes at least three detector elements (A, B, C), a first connecting line between a first one of the detector elements (A) and a second one of the detector elements (C) having a first predetermined length (a) not being parallel to a second connecting line between a third one of the detector elements (C) and the second detector element (B) having a second predetermined length (b); and
  wherein the first set of detection signals is obtained from the first and the second detector elements (A, B) and wherein the second set of detection signals is obtained from the second and the third detection elements (B, C).

5. The positioning device according claim 1, wherein the position determining unit is adapted to obtain the first set of detection signals with the detector having a first orientation and to obtain the second set of detection signals with the detector having a second orientation rotated with respect to the first orientation.

6. The positioning device according to claim 1, wherein the position determining unit is adapted to
  obtain a third and fourth set of detection signals with the propagation axis of the fan shaped laser beam of a laser emitter tilted by an angle with respect to the orientation of the propagation axis for obtaining the first set and second set of detection signals;
  determine a third time interval between the detection signals of the third set and a fourth time interval between the detection signals of the fourth set;
  determine, based on the angular velocity of the fan shaped laser beam and the third and fourth time intervals of a plurality of detector elements, two other angles between the detector elements;
  determine, based on the two other detector element angles and the spatial relation of the detector elements, a second distance of the detector to the tilted propagation axis; and
  determine, based on the distance and the second distance, a position of the detector with respect to the laser emitter.

7. The positioning device according to claim 1, wherein the position determining unit is adapted to
  determine a reference angle of one of the detector elements with respect to a reference orientation and
  determine a position of the detector relative to the propagation axis and the reference orientation based on the reference angle and the distance of the detector to the propagation axis.

8. The positioning device according to claim 1, wherein the detector includes at least one level sensor for indicating at least one reference orientation of the detector in space.

9. The positioning device according to claim 1, further comprising
  a laser emitter for emitting the fan shaped laser beam rotating around the propagation axis with the direction of rotation.

10. A positioning method, comprising:
  detecting light of a fan shaped laser beam rotating around a propagation axis with a direction of rotation by a detector with at least two detector elements (A, B) arranged in a known spatial relation to one another and outputting a detection signal when irradiated by the fan shaped laser beam;
  obtaining a first set of detection signals from the detector elements;
  determining at least one first time relation between the detection signals of the first set;
  determining a positional relation between the detector and the propagation axis based on the first time relation;
  obtaining the first set of detection signals from detector elements arranged along a first line;
  obtaining a second set of detection signals from detector elements arranged along a second line, the first and second lines not being parallel with respect to one another;
  determining at least one second time relation between the detection signals of the second determining a repetition time interval between two detection signals from the same detector element;
  determining an angular velocity (ω) of the fan shaped laser beam based thereon;
  determining a first time interval between the detection signals of the first set and a second time interval between the detection signals of the second set;
  determining, based on the angular velocity of the fan shaped laser beam and the first and second time intervals of a plurality of detector elements, two angles between the detector elements; and
  determining, based on the two detector element angles and the spatial relation of the detector elements, a distance of the detector to the propagation axis.

11. The positioning method according to claim 10, wherein the first time relation is a first time sequence of the detection signals of the first set, and the method further comprising
    determining one of at least two segments of a plane intersecting the propagation axis, in which the detector is located.

12. The positioning method according to claim 11, wherein the second time relation is a second time sequence of the detection signals of the second set, and the method further comprising
    determining one of at least four segments of the plane intersecting the propagation axis, in which the detector is located based on the first time sequence and the second time sequence.

13. The positioning method according to claim 10, wherein the detector includes at least three detector elements (A, B, C), a first connecting line between a first one of the detector elements (A) and a second one of the detector elements (C) having a first predetermined length (a) not being parallel to a second connecting line between a third one of the detector elements (C) and the second detector element (B) having a second predetermined length (b); and the method further comprising
    obtaining the first set of detection signals from the first and the second detector elements (A, B), and
    obtaining the second set of detection signals from the second and the third detection elements (B, C).

14. The positioning method according to claim 10, further comprising
    obtaining the first set of detection signals with the detector having a first orientation, and
    obtaining the second set of detection signals with the detector having a second orientation rotated with respect to the first orientation.

15. The positioning method according to claim 10, further comprising
    obtaining a third and fourth set of detection signals with the propagation axis of the fan shaped laser beam of a laser emitter tilted by an angle with respect to the orientation of the propagation axis for obtaining the first set and second set of detection signals;
    determining a third time interval between the detection signals of the third set and a fourth time interval between the detection signals of the fourth set;
    determining, based on the angular velocity of the fan shaped laser beam and the third and fourth time intervals of a plurality of detector elements, two other angles between the detector elements;
    determining, based on the two other detector element angles and the spatial relation of the detector elements, a second distance of the detector to the tilted propagation axis; and
    determining, based on the distance and the second distance, a position of the detector with respect to the laser emitter.

16. The positioning method according to claim 10, further comprising
    determining a reference angle of one of the detector elements with respect to a reference orientation, and
    determining a position of the detector relative to the propagation axis and the reference orientation based on the reference angle and the distance of the detector to the propagation axis.

17. The positioning method according to claim 10, further comprising
    indicating at least one reference orientation of the detector in space using at least one level sensor.

\* \* \* \* \*

UNITED STATES PATENT AND TRADEMARK OFFICE
CERTIFICATE OF CORRECTION

| | |
|---|---|
| PATENT NO. | : 8,526,014 B2 |
| APPLICATION NO. | : 12/999697 |
| DATED | : September 3, 2013 |
| INVENTOR(S) | : Lars Schumacher et al. |

It is certified that error appears in the above-identified patent and that said Letters Patent is hereby corrected as shown below:

In the Claims

Col. 20, Claim 10, Line 52, "of the second determining" should read --of the second set; determining--.

Signed and Sealed this
Sixth Day of May, 2014

Michelle K. Lee
*Deputy Director of the United States Patent and Trademark Office*